(12) United States Patent
Hillgren et al.

(10) Patent No.: US 7,942,370 B2
(45) Date of Patent: May 17, 2011

(54) VORTEX DETECTION AND TURBULENCE MEASUREMENT

(75) Inventors: Robert Hillgren, Linköping (SE);
Tommy Persson, Linköping (SE);
Fredrik Karlsson, Linköping (SE)

(73) Assignee: SAAB AB, Linköping (SE)

( * ) Notice: Subject to any disclaimer, the term of this patent is extended or adjusted under 35 U.S.C. 154(b) by 1044 days.

(21) Appl. No.: 11/797,739

(22) Filed: May 7, 2007

(65) Prior Publication Data
US 2010/0012789 A1    Jan. 21, 2010

(30) Foreign Application Priority Data
May 5, 2006    (EP) .................... 06113595

(51) Int. Cl.
*G05D 1/00*    (2006.01)
(52) U.S. Cl. ................... 244/194; 244/175
(58) Field of Classification Search .......... 244/175, 244/177, 194, 195
See application file for complete search history.

(56) References Cited

U.S. PATENT DOCUMENTS
4,728,951 A    3/1988    Johnson et al.
5,995,880 A    11/1999    Larramendy et al.

OTHER PUBLICATIONS
European Search Report—Aug. 24, 2006.

*Primary Examiner* — Timothy D Collins
*Assistant Examiner* — Joseph W Sanderson
(74) *Attorney, Agent, or Firm* — Venable LLP; Eric J. Franklin

(57) ABSTRACT

A vortex detection device suitable for use in fighter aircraft including an angle-of-attack sensor, an angle-of-attack processing unit connected to the angle-of-attack sensor capable of forming a signal representative of current air stream's angle-of-attack, a synthetic angle-of-attack estimation unit capable of forming a synthetic angle-of-attack signal, and a vortex level calculation unit connected to the processing and estimation unit, capable of calculating a vortex level signal, and a vortex detection unit connected to the vortex level calculation unit, for deciding, based on the vortex level signal, if a vortex is detected.

13 Claims, 3 Drawing Sheets

VORTEX DETECTION AND TURBULENCE MEASUREMENT

CROSS-REFERENCE TO RELATED APPLICATION

This application claims priority to European patent application number 06113595.0 filed 5 May 2006.

FIELD OF INVENTION

The present invention relates to sensing and assessing surrounding airflow onboard an aircraft. In particular it relates to a method and means for the detection of when an aircraft passes through wake vortices from another aircraft.

BACKGROUND

Military fighter and attack aircraft of the fourth generation are designed as basically statically unstable aircraft, which are stabilized with an electrical flight control system continuously adjusting a number of control surfaces. This design is chosen in order to achieve the highest possible performance throughout the total flight envelope. The electrical flight control system uses sensor information regarding aircraft flight parameters such as pitch, roll, and yaw. The system also receives and utilizes information regarding wind and gusts. The primary purpose of using the information is to minimize the influence from external disturbances, which may deteriorate performance and other control performances, in order to gain better aircraft and weapon system performance. Information can come from internal gyro signals and from total and static pressure (pitot tubes) and angle-of-attack and sideslip (alpha and beta vanes).

However, some difficulties may arise when such an aircraft unintentionally passes through wake vortices from another aircraft. The continuously adjusting electric control system receives sensor signals from the wake vortex passage, that give rise to unintentional control surface movement and an unintentional aircraft response. This can lead to angle of attack overshoots above the angle of attack limits.

An object of the present invention is therefore to provide a solution that reduces the risk for diminished control of a fourth generation aircraft when passing through wake vortices.

SUMMARY OF THE INVENTION

In order to achieve the above mentioned reduced risk and performance gains and at the same time stabilize the statically unstable aircraft, and further provide a so to speak "carefree" use of the aircraft during missions, i.e., such that the pilot doesn't have to consider stall limits, structural limits, engine limits etc., a system according to the present invention is provided. In order to achieve this and retain good aiming and flight characteristics, sensor information is fed to the flight control system regarding aircraft position parameters from angular rate gyro signals, and angle of attack from alpha-vanes in the aircraft nose. The alpha-vanes in the nose of the aircraft have the primary function to measure the angle of the incoming air stream and the magnitude of external disturbances such as wind and turbulence. The control system is provided with means to compensate for these disturbances, thereby minimizing the deviation from the position ordered by the pilot, e.g., when aiming.

When an aircraft flies, it creates wake vortices. The strength of said wake vortices depends on the weight and load factor of the aircraft. During dogfight practice using a target aircraft, it can happen that the chasing aircraft passes through the wake vortices of the target aircraft. This can be hazardous since the aircraft can be strongly affected by the wake vortices of the aircraft in front, if the passing takes place in an unsuitable way. Therefore, as a general rule for all aircraft, wake vortices shall be avoided.

The alpha-vanes of an aircraft are influenced during passage of such wake vortices, which can lead to unnecessary commands to the control surfaces such as rudder, elevator and ailerons which in turn may cause large angles of attack, if the aircraft is close to the angle of attack limit during passage of the wake vortices of the aircraft in front.

During passage of wake vortices there is thus a need for an angle-of-attack signal that is more calm, such that large and unfavourable movements of control surfaces can be avoided.

Therefore, a further purpose of the present invention is to provide a method and a device capable of switching to another angle of attack signal when passing a wake vortex, but still maintaining good or excellent flight and aiming characteristics when flying in calm and turbulent air.

DETAILED DESCRIPTION OF PREFERRED EMBODIMENTS

The following word is used in this document with its defined meanings. With "Disturbed air" is meant air such as turbulence, wind shifts, crosswinds, jet stream, wake vortices, engine exhausts, propeller slipstream etc.

In order to be able to switch to a more calm angle-of-attack signal when passing a wake vortex, a wake vortex detector is provided. The wake vortex detector can be used to control switching to a more calm angle-of-attack signal and/or to switch to another control law when passing a wake vortex or passing through turbulent air of a certain magnitude.

Figure 1A:
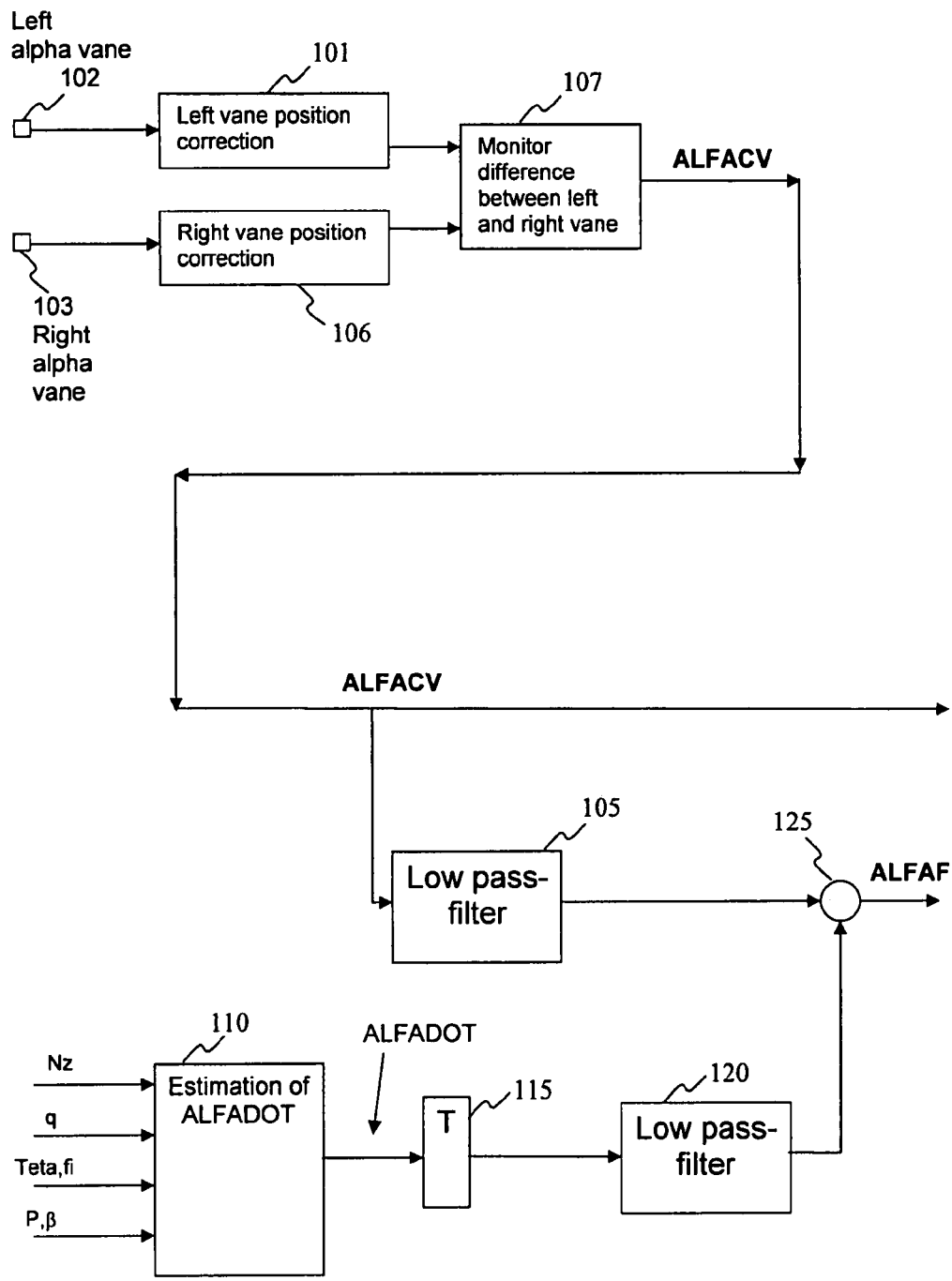
FIGS. 1a and b show a block diagram of a wake vortex detector.
Figure 1B:
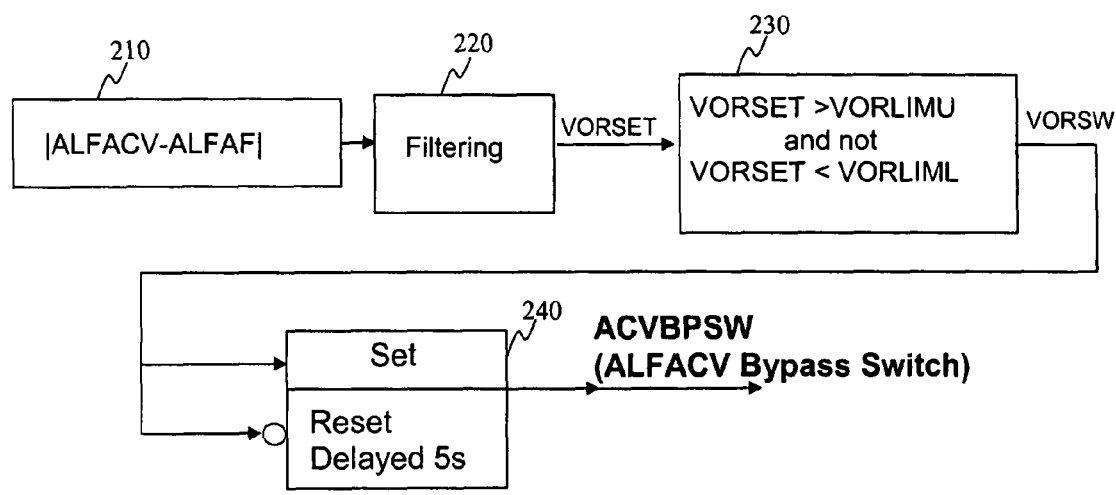
FIG. 1c shows a turbulence level unit for use in the wake vortex detector of FIGS. 1a and b.
Figure 1C:
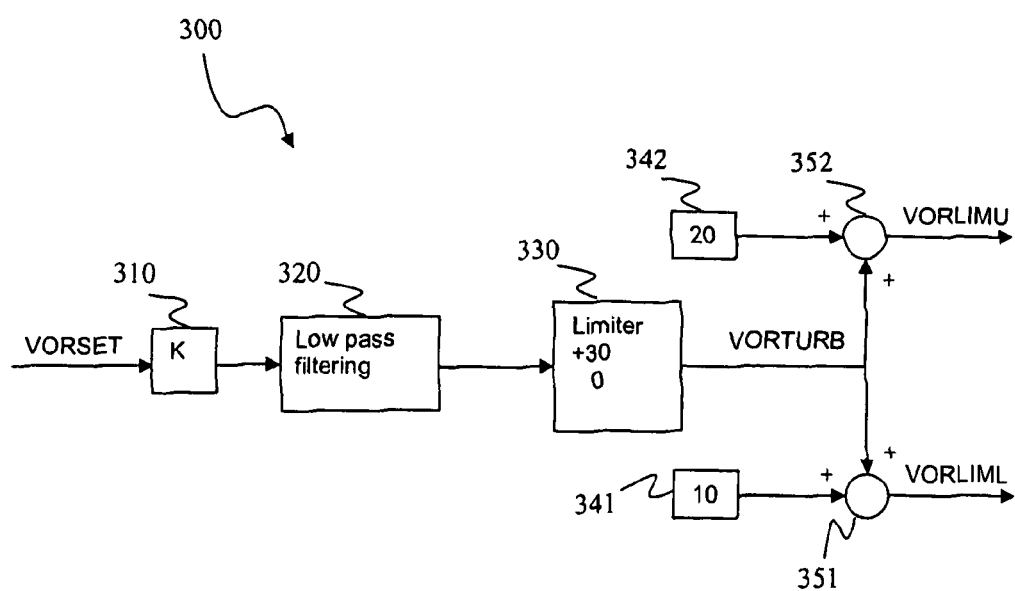

FIGS. 1a, 1b, 1c show a block diagram for a wake vortex detector. A left angle-of-attack sensor 102 and a right angle-of-attack sensor 103, preferably alpha vane sensors, are connected to position error correction units 101, 106. Said position error correction units 101, 106 are devised to correct each sensor signal for position related errors due to their actual position on the aircraft fuselage. An alpha monitor unit 107 is connected to the position error correction units 101, 106 and receives the corrected angle-of-attack signals. The alpha monitor unit 107 monitors the difference between the left and right corrected signals. If the difference is within a certain monitor threshold, an angle-of-attack signal ALFACV is calculated as the average of the left and right position corrected alpha vane signals. If the difference is greater than the monitor threshold an alpha vane sensor failure is detected. The alpha monitor unit 107 is connected to an ALFACV low pass filter 105 and the ALFACV signal is fed to said ALFACV low pass filter unit 105, which filter the signal forming a filtered ALFACV, hereinafter referred to as ALFACVFIL.

FIG. 1a further shows how an auxiliary signal, here called ALFAF, is determined. The meaning of ALFAF will be further explained below.

First, a signal representative of a synthetic angle of attack rate, ALFADOT is created.

The angle of attack rate ALFADOT is calculated from the force equation in z-axis using the following expression:

$$\text{ALFADOT} = -(Nz - (\cos\phi \cos\theta))*(g/V) - p*\beta + q \quad (I)$$

where Nz is the load factor in the z-axis, θ is the pitch attitude angle, φ is the bank angle, g is approximately 9.81, V the velocity, p roll rate, β sideslip angle and q pitch rate. Reference: "Tillståndsekvationer för linjär flygplandynamik". Author: K J Åström and P -O Elgcrona.

The roll rate p is preferably received as a sensor signal originating from a gyro. The pitch rate q is also preferably received as a sensor signal originating from a gyro. The bank angle phi (φ) is preferably received from an inertial navigation system. The sideslip angle beta (β) is calculated from lateral acceleration not to be dependent on a sideslip sensor. This has the advantage of not requiring a sideslip vane sensor for calculating ALFADOT.

A normal load factor signal Nz available from an inertial navigation system or directly from a suitable acceleration sensor or the like, is fed to an ALFADOT estimation unit 110 for estimating a signal representative of an angle of attack rate ALFADOT. The ALFADOT estimation unit 110 is also be fed with a signal representative of the pitch rate q, the pitch attitude angle signal Theta, the bank angle phi (φ), the roll rate signal p, and the sideslip signal β.

The estimation unit 110 is further connected to a time constant T represented in FIG. 1 by time constant unit 115, and filtered by low pass filter 120, resulting in a filtered signal ALFASYNTFIL.

A summation unit 125 is provided which is connected to the output of the low-pass filter unit 120 and which summation unit is fed with the ALFASYNTFIL signal and the ALFACVFIL signal. The output from the summation unit 125 is referred to as the ALFAF signal.

The ALFAF signal can be viewed upon as a steady or "smooth" angle-of-attack signal. The summation unit is connected to a vortex level calculation units 210 and 220. Said level calculation units 210 and 220 provide calculation of the absolute value of the difference between ALFACV signal and the ALFAF signal, and a difference signal is formed, indicating how much the air is disturbed. This measure signal is filtered and the filtered signal is in the following referred to as the VORSET signal. The VORSET signal is fed to a decision unit 230 that decides whether the level of the VORSET signal represents a vortex passage or not. This is accomplished by comparing the VORSET signal with predetermined limits. A method for determining these predetermined limits will be suggested below.

Further, a logical vortex switch signal, referred to as VORSW is set if VORSET is greater than an upper vortex limit VORLIMU and reset if VORSET is less than a lower vortex limit VORLIML. The VORSW signal, in short, is the result signal which tells the result of the detection. The limits are preferable predetermined to suitable values found appropriate through simulations and/or tests. In tests and simulations performed during the development of the present invention, an upper vortex limit of 20 degrees per second and a lower limit of 10 degrees per second have been found appropriate. That is, VORSW is set when VORSET is greater than 20 degrees per second and reset when VORSET is less than 10 degrees per second.

Now referring to FIG. 1c, in a further embodiment the upper and lower vortex limits may be automatically adjusted to the current turbulence level. A turbulence level unit 300 is provided that measures the turbulence level through a low pass filter 320 of preferably 5 seconds and an amplification factor, unit 310 called K, where K is 2. The upper and lower limits are adjusted upwards depending on severity of turbulence by limiting the filtered VORSET signal in a limiter 330, then feeding the limited signal VORTURB to two summation units 351, 352. Value 10 is added from a first value unit 341 to summation unit 351 to form lower limit. Value 20 is added from a second value unit 342 to summation unit 352 to form upper limit. This arrangement entails that when there is zero turbulence there is no adjustment, whereas during heavy turbulence both limits are adjusted maximum 30 degrees per second, to a maximal upper limit of 50 degrees per second and a maximal lower limit of 40 degrees per second.

Now referring to FIG. 1b again, in a preferred embodiment the decision unit 230 is connected to an onset control unit 240. The logical vortex switch signal VORSW sets an ACVBPSW signal, which signal, in short, is a modified result signal which tells the system when to bypass the ALFACV. The ACVBPSW signal is kept on for an additional period of time, preferably around 5 seconds, by the onset control unit 240, to prevent use of ALFACV before vortex has fully passed. The modified logical vortex switch signal ACVBPSW is in the described way used, directly or in logical combination to automatically switch to ALFAF instead of ALFACV as angle-of-attack input signal to control system, or to switch between two control laws.

In a further embodiment, in addition to vortex limit values VORLIMU and VORLIML, turbulence limit values lower than the vortex level values can be used in a similar way to detect when the aircraft is passing through turbulent air. The actual limits can be determined by simulations and test.

A further advantage of the present invention is that when switching from one alpha signal to another (from ALFACV to ALFAF) both the transient and the increase of angle-of-attack are reduced to a minimum, when passing a vortex.

The invention claimed is:

1. A method for an aircraft provided with an electric flight control system to improve flight in disturbed air, the method comprising:
    receiving a current airflow direction signal from an angle-of-attack sensor;
    creating a synthetic angle-of-attack signal that is more calm than the current airflow direction signal received from the angle-of-attack sensor;
    using said airflow direction signal and the synthetic angle-of-attack signal to form a wake vortex level signal representative of a current wake vortex level of the air meeting the aircraft;
    testing a magnitude of said wake vortex signal;
    deciding based on said magnitude, if the aircraft is passing through wake vortex disturbed air or not;
    if the aircraft is judged to pass trough vortex disturbed air, switching from a normal way of flight control to an alternative way of flight control; and
    deciding, based on said magnitude, when wake vortex is passed, and if so switch back to the normal way of flight control,
    wherein the switching from a normal way of flight control to an alternative way of flight control includes switching angle-of-attack input signal from what is measured by the angle-of-attack sensor to the synthetic angle-of-attack signal when the aircraft passes into vortex disturbed air, and vice versa when the aircraft has entered non-disturbed air again.

2. The method according to claim 1, wherein the angle-of-attack sensor is an alpha vane sensor.

3. The method according to claim 1, wherein the synthetic angle-of-attack rate is estimated using the expression (I)

$$\text{ALFADOT} = (Nz - (\cos \phi \cos \theta)) * (g/V) - p*\beta + q \quad \text{(I)}$$

where ALFADOT is the estimated angle-of-attack rate, Nz is the load factor in the z-axis, θ is the pitch attitude angle, φ is the bank angle, g is acceleration due to gravity, V the velocity, p roll rate, β sideslip angle and q pitch rate.

4. The method according to claim 3, wherein the synthetic angle-of-attack rate is passed through a time constant unit and subsequently used to form a synthetic angle-of-attack signal that is smooth.

5. The method according to claim 4, wherein a difference signal between angle-of-attack signal and the more calm synthetic angle-of-attack signal is used to indicate how much the air is disturbed.

6. A method for detecting when an aircraft is passing through disturbed air, the method comprising:
  receiving a current airflow direction signal from an angle-of-attack sensor;
  creating a synthetic angle-of-attack signal that is more calm than the current airflow direction signal received from the angle-of-attack sensor;
  using said airflow direction signal and the synthetic angle-of-attack signal to form a turbulence level signal representative of a current turbulence level of the air stream;
  testing a magnitude of said turbulence level signal;
  deciding based on said magnitude, if the aircraft is passing through turbulent air or not and
  issuing a detection signal when if it is decided that the aircraft is passing through disturbed air.

7. An electric flight control system useable by an aircraft for improved passage of disturbed air, the system comprising:
  a time constant unit,
  an angle-of-attack sensor configured to sense a current airflow direction signal,
  a synthetic angle-of-attack rate estimation unit connected to the time constant unit, and configured to create a synthetic angle-of-attack signal that is more calm than the current airflow direction signal received from the angle-of-attack sensor,
  a wake vortex level calculation unit connected to said time constant unit and capable of calculating a synthetic angle of attack signal, for use in the wake vortex level calculation unit,
  a wake vortex detection unit connected to said wake vortex level calculation unit capable of detecting, based on said wake vortex level signal, when the aircraft passes through disturbed air,
  an onset control unit capable of issuing a detection signal when the wake vortex detection unit detects when the aircraft passes through disturbed air, and
  a switching unit, connected to said detection unit, for switching to another way of flight control when the detection signal is set, and to restore normal way of flight control when the detection signal has been unset, wherein the switching to another way of flight control includes switching angle-of-attack input signal from what is measured by the angle-of-attack sensor to the synthetic angle-of-attack signal when the aircraft passes into vortex disturbed air, and vice versa when the aircraft has entered non-disturbed air again.

8. The flight control system according to claim 7, wherein said switch of way of flight control comprises switching set of flight control laws.

9. The flight control system according to claim 7, wherein said switch way of flight control comprises switching angle-of-attack input signal from a sensor based input signal to a synthetic input signal.

10. A wake vortex detection device, comprising:
  an angle-of-attack sensor configured to sense a current airflow direction signal,
  a time constant unit,
  an angle-of-attack rate estimation unit connected to the time constant unit, for calculating a synthetic angle-of-attack signal that is more calm than the current airflow direction signal received from the angle-of-attack sensor,
  a vortex level calculation unit connected to said angle-of-attack sensor and configured to receive said synthetic angle-of-attack signal, and capable of calculating a wake vortex level signal, and
  a wake vortex detection unit connected to said wake vortex level calculation unit capable of detecting, based on said wake vortex level signal, when the aircraft passes through wake vortex disturbed air.

11. The wake vortex detection device according to claim 10, wherein said angle-of-attack rate estimation unit uses the expression to estimate the angle-of-attack rate $$\text{ALFADOT} = -(Nz - (\cos \phi \cos \theta)) * (g/V) - p*\beta + q \quad \text{(I)}$$

where ALFADOT is the estimated angle-of-attack rate, Nz is the load factor in the z-axis, θ is the pitch attitude angle, φ is the bank angle, g is acceleration due to gravity, V the velocity, p roll rate, β sideslip angle and q pitch rate.

12. A turbulence detection device, comprising:
  an angle-of-attack sensor configured to sense a current airflow direction signal,
  a time constant unit,
  a synthetic angle-of-attack rate estimation unit connected to the time constant unit, for calculating a synthetic angle-of-attack signal that is more calm than the current airflow direction signal received from the angle-of-attack sensor,
  a vortex level calculation unit connected to said angle-of-attack sensor and to said time constant unit, and capable of calculating a wake vortex level signal, and
  a wake vortex detection unit connected to said wake vortex level calculation unit capable of detecting, based on said wake vortex level signal, when the aircraft passes through turbulent air.

13. The turbulence detection device according to claim 12, wherein the synthetic angle-of-attack rate is estimated using the expression (I)

$$\text{ALFADOT} = -(Nz - (\cos \phi \cos \theta)) * (g/V) - p*\beta + q \quad \text{(I)}$$

where ALFADOT is the estimated angle-of-attack rate, Nz is the load factor in the z-axis, θ is the pitch attitude angle, φ is the bank angle, g is acceleration due to gravity, V the velocity, p roll rate, β sideslip angle and q pitch rate.

\* \* \* \* \*